United States Patent
Feng et al.

(10) Patent No.: US 11,704,239 B2
(45) Date of Patent: Jul. 18, 2023

(54) GARBAGE COLLECTION METHOD FOR STORAGE MEDIUM, STORAGE MEDIUM, AND PROGRAM PRODUCT

(71) Applicant: Huawei Technologies Co., Ltd., Shenzhen (CN)

(72) Inventors: Rui Feng, Beijing (CN); Shengqian Jia, Beijing (CN); Dingguo Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 678 days.

(21) Appl. No.: 16/577,106

(22) Filed: Sep. 20, 2019

(65) Prior Publication Data

US 2020/0012598 A1    Jan. 9, 2020

Related U.S. Application Data (63) Continuation of application No. PCT/CN2018/080241, filed on Mar. 23, 2018.

(51) Int. Cl.
*G06F 12/02* (2006.01)
*G06F 3/06* (2006.01)
*G06F 12/0891* (2016.01)

(52) U.S. Cl.
CPC .......... *G06F 12/0253* (2013.01); *G06F 3/064* (2013.01); *G06F 3/065* (2013.01); *G06F 3/0679* (2013.01); *G06F 12/0891* (2013.01); *G06F 3/0607* (2013.01)

(58) Field of Classification Search
CPC .......................... G06F 12/0253; G06F 3/0641
See application file for complete search history.

(56) References Cited

U.S. PATENT DOCUMENTS

| | | | |
|---|---|---|---|
| 2009/0319720 | A1 | 12/2009 | Stefanus et al. |
| 2017/0168929 | A1* | 6/2017 | Kanno ............... G06F 12/0246 |
| 2017/0357458 | A1* | 12/2017 | de Silva .................. G06F 3/064 |
| 2018/0239671 | A1* | 8/2018 | Wei ........................ G06F 3/0619 |

FOREIGN PATENT DOCUMENTS

| | | |
|---|---|---|
| CN | 102289412 A | 12/2011 |
| CN | 102841850 B | 4/2016 |
| CN | 105892941 A | 8/2016 |

(Continued)

OTHER PUBLICATIONS

Machine Translation and Abstract of Chinese Publication No. CN102289412, Dec. 21, 2011, 13 pages.

(Continued)

*Primary Examiner* — Baboucarr Faal
(74) *Attorney, Agent, or Firm* — Conley Rose, P.C.

(57) ABSTRACT

A garbage collection technology for a storage medium that includes a plurality of blocks, where each storage unit has a collection parameter related to data in one of the blocks, and where each block includes a plurality of pages. A group of blocks is selected from the plurality of blocks based on the collection parameter. A difference between values of collection parameters of any two blocks in the group of blocks is not greater than a preset value. Data in a first valid page and a second valid page in the group of blocks is replicated to a same destination block, to facilitate garbage collection.

34 Claims, 4 Drawing Sheets

(56) References Cited

FOREIGN PATENT DOCUMENTS

| CN | 106681934 A | 5/2017 |
|---|---|---|
| CN | 106681935 A | 5/2017 |
| CN | 107544754 A | 1/2018 |

OTHER PUBLICATIONS

Machine Translation and Abstract of Chinese Publication No. CN102841850, Apr. 20, 2016, 10 pages.
Machine Translation and Abstract of Chinese Publication No. CN105892941, Aug. 24, 2016, 12 pages.
Machine Translation and Abstract of Chinese Publication No. CN107544754, Jan. 5, 2018, 16 pages.
Choi, C., et al.,"Multi-Stream Write SSD, Increasing SSD Performance and Lifetime with Multi-Stream Write Technology," Samsung Semiconductor, Inc.,Flash Memory Summit, 2016, 20 pages.
"The idea of wear balancing algorithm tripled," Sep. 19, 2016, 10 pages.
Foreign Communication From A Counterpart Application, PCT Application No. PCT/CN2018/080241, English Translation of International Search Report dated Dec. 26, 2018, 2 pages.

* cited by examiner

GARBAGE COLLECTION METHOD FOR STORAGE MEDIUM, STORAGE MEDIUM, AND PROGRAM PRODUCT

CROSS-REFERENCE TO RELATED APPLICATIONS

This application is a continuation of International Patent Application No. PCT/CN2018/080241, filed on Mar. 23, 2018, the disclosure of which is hereby incorporated by reference in its entirety.

TECHNICAL FIELD

The present disclosure relates to the field of storage, and in particular, to the field of garbage collection for a storage medium.

BACKGROUND

A flash memory is used as a storage medium of a solid-state drive (SSD). Characterized by advantages such as quick startup, low noise, and a low latency, the flash memory is increasingly popular with users, and gradually replaces a magnetic disk (magnetic disk) to become a mainstream storage medium of a high-end storage device. An internal package of the solid-state drive is of a structure including channels, chips, pages, and blocks. Each block includes a plurality of pages.

In the SSD, a minimum unit of data read/write is a page. A difference from a conventional magnetic disk is that the SSD cannot perform overwriting. To be more specific, new data cannot be directly written, through overwriting, into a page in which data has been written. Instead, the new data can be written only after an "erasure" operation is performed on the page. However, in the SSD, data erasure is performed on a block basis, and cannot be performed on a single page.

In the SSD field, when a quantity of pages, in a block, storing invalid data reaches a threshold, valid data in the block may be replicated to another block and then the block is erased, to reuse the pages occupied by the invalid data. This process is referred to as garbage collection (GC). Storage space occupied by the invalid data can be reused through the garbage collection. However, block erasure reduces a service life of the block. In other words, a quantity of times of block erasure is limited. Therefore, how to reduce a quantity of times of garbage collection as much as possible is a problem to be resolved.

SUMMARY

According to a first aspect, a garbage collection method for a storage medium is provided. The storage medium includes a plurality of storage units, each storage unit has a first collection parameter, the first collection parameter is related to data in the storage unit, and each storage unit includes a plurality of read/write units. A group of storage units is selected from the plurality of storage units based on the first collection parameters. A difference between values of first collection parameters of any two storage units in the group of storage units is not greater than a preset value, each storage unit in the group of storage units includes a stale read/write unit, and the stale read/write unit is a read/write unit storing invalid data. Data in a first valid read/write unit and a second valid read/write unit in the group of storage units is replicated to a same destination storage unit. The first valid read/write unit and the second valid read/write unit belong to different storage units in the group of storage units, and the destination storage unit is included in the plurality of storage units. The storage medium may be a flash memory medium or a shingled magnetic recording (SMR) medium.

The solution is applied, such that data in the storage medium can be aggregated to different storage units based on duration of the data in the medium to some extent. Further, a larger quantity of times for which the solution is performed indicates a more noticeable aggregation effect. Data tiering is implemented based on "ages".

There is a relatively low probability that garbage collection is performed on a block in which old data is located. Therefore, a probability that the block in which the old data is located is erased in the future is decreased, ensuring a service life of the block in which the old data is located. However, massive stale pages are usually centralized in a block in which new data is located; consequently, there is a relatively high probability that garbage collection is performed on the block in which the new data is located. In addition, data migration does not need to be performed on the stale pages in a garbage collection process. Therefore, a volume of data that needs to be migrated is not excessively large when garbage collection is performed on the block in which the new data is located, such that a computing resource and a bandwidth resource of a storage device that are occupied due to migration of massive data are reduced. Moreover, the stale pages all become free pages after the garbage collection, such that a relatively large quantity of available storage space can be obtained after the garbage collection is performed on the block in which the new data is located. Furthermore, after the new data and the old data are separated to different storage units, a quantity of blocks on which garbage collection has been performed in an SSD is decreased in total. It should be noted that "old" and "new" are only relative concepts, and duration of the "old" data in the storage medium is earlier than duration of the "new" data in the storage medium.

In a first possible implementation of the first aspect, the method further includes replicating data in all valid read/write units in the group of storage units except the first valid read/write unit and the second valid read/write unit to a storage unit outside the group of storage units; and erasing all data in the group of storage units.

After data migration is completed, the storage unit is erased, such that storage space in the storage medium can be released for subsequent data storage.

In a second possible implementation of the first aspect, a value of a first collection parameter of a storage unit in which the first valid read/write unit is located is a first parameter value, and a value of a first collection parameter of a storage unit in which the second valid read/write unit is located is a second parameter value. In this case, in the first possible implementation, the method may further include configuring a value of a first collection parameter of the destination storage unit to be a third parameter value based on the first parameter value, the second parameter value, and an original value of the first collection parameter of the destination storage unit.

After data replication is performed, the value of the first collection parameter needs to be updated. The solution describes how to obtain a new value of the first collection parameter.

In a third possible implementation of the first aspect, based on the second possible implementation of the first aspect, garbage collection is respectively performed on the storage medium for a plurality of times at a plurality of previous time points, and the first parameter value, the second parameter value, and the original value of the first collection parameter of the destination storage unit are determined based on the plurality of previous time points at which the garbage collection has been performed.

The solution further describes, based on the second possible implementation of the first aspect, how to calculate the new value of the first collection parameter.

In a fourth possible implementation of the first aspect, based on the third possible implementation of the first aspect, the first parameter value, the second parameter value, and the original value of the first collection parameter of the destination storage unit respectively represent three same or different time points in the plurality of time points, and the third parameter value is determined by comparing the three same or different time points.

The solution further describes, based on the third possible implementation of the first aspect, how to calculate the new value of the first collection parameter.

In a fifth possible implementation of the first aspect, based on the third possible implementation of the first aspect, the data is sequentially written based on a write time into a data storage location in the destination storage unit starting from an initial write pointer of the storage unit; in the destination storage unit, data replicated from the first valid read/write unit is stored in a first location, and data replicated from the second valid read/write unit is stored in a second location; and the first location is closer to the initial write pointer of the destination storage unit than the second location.

The solution further describes, based on the third possible implementation of the first aspect, a storage rule of data in the storage unit after a host (or another computer) writes the data into the storage medium.

In a sixth possible implementation of the first aspect, based on the second possible implementation of the first aspect, the method further includes respectively performing garbage collection for a plurality of times at a plurality of previous time points, where the first parameter value, the second parameter value, and the original value of the first collection parameter of the destination storage unit are determined based on a quantity of times of the garbage collection performed previously.

The solution describes a calculation method for the original value of the first collection parameter: The original value of the first collection parameter may be determined based on the quantity of times of the garbage collection performed previously.

In a seventh possible implementation of the first aspect, based on the fourth possible implementation of the first aspect, the third parameter value is determined based on the first parameter value, the second parameter value, the original value of the first collection parameter of the destination storage unit, and a fixed incremental.

The solution describes a calculation method for the third parameter value, that is, a manner of adding the fixed incremental (for example, adding a fixed value of 1, adding a fixed value of 10, or adding a fixed value of −0.5).

In an eighth possible implementation of the first aspect, based on the second possible implementation of the first aspect, the method may further include: replicating data in all valid read/write units in the group of storage units except the first valid read/write unit and the second valid read/write unit to a storage unit outside the group of storage units, where the storage unit outside the group of storage units includes the destination storage unit; configuring the value of the first collection parameter of the destination storage unit based on the third parameter value; and erasing all data in the group of storage units.

The solution describes a case in which the data in all the other valid read/write units (for example, a valid page) is also replicated. Replication of all valid data in the storage unit is completed, such that the entire storage unit is erased.

In a ninth possible implementation of the first aspect, based on the solution in the first aspect, the group of storage units selected based on the first collection parameter include a particular storage unit, and the method further includes migrating a data unit in the particular storage unit to a storage unit selected based on a wear degree.

The solution describes further application that is based on the garbage collection: Data migration may be performed based on the wear degree and a data age, to achieve a technical effect of wear leveling.

In a tenth possible implementation of the first aspect, based on the solution in the first aspect, the collection parameter includes a second collection parameter, a value of a second collection parameter of a storage unit in which the first valid read/write unit is located is a seventh parameter value, a value of a second collection parameter of a storage unit in which the second valid read/write unit is located is an eighth parameter value, and the solution in the first aspect further includes configuring a value of a second collection parameter of the destination storage unit to be a ninth parameter value based on the seventh parameter value, the eighth parameter value, and an original value of the second collection parameter of the destination storage unit, where the value of the second collection parameter is related to a time point at which garbage collection is performed on the storage unit.

The solution describes a new parameter, that is, the second collection parameter, and a calculation principle of the parameter.

In an eleventh possible implementation of the first aspect, based on the tenth possible implementation of the first aspect, the group of storage units selected based on the first collection parameter and the second collection parameter include a particular storage unit; the method further includes migrating a data unit in the particular storage unit to a storage unit selected based on a wear degree.

The solution describes how to use the second collection parameter for wear leveling.

In a twelfth possible implementation of the first aspect, based on the first aspect, a first storage unit may be selected from the plurality of storage units based on the first collection parameters, where the first storage unit includes a stale read/write unit; and data in a valid read/write unit in the first storage unit is migrated to a second storage unit, where the second storage unit includes an idle read/write unit.

The solution describes data replication in single-storage-unit garbage collection, and the data replication and the replication (which may be referred to as data replication in multiple-storage-unit garbage collection) described in the first aspect may be concurrently performed. For example, in a same storage medium, data replication in multiple-storage-unit garbage collection is performed on a storage unit whose first collection parameter is greater than a threshold, and data replication in single-storage-unit garbage collection is performed on a storage unit whose first collection parameter is less than the threshold.

In a thirteenth possible implementation of the first aspect, based on the twelfth possible implementation of the first aspect, a value of a first collection parameter of the first storage unit is a fourth parameter value, and a value of a first collection parameter of the second storage unit is a fifth parameter value. The method further includes configuring a value of a first collection parameter of the destination storage unit to be a sixth parameter value based on the fourth parameter value and the fifth parameter value.

The solution describes update of the value of the first collection parameter in a replication operation in the single-storage-unit garbage collection.

According to a second aspect, a storage medium is provided. The storage medium includes a medium controller and a plurality of storage units, each storage unit has a first collection parameter, the first collection parameter is related to data in the storage unit, and each storage unit includes a plurality of read/write units. The medium controller can perform the first aspect and the possible implementations of the first aspect.

According to a third aspect, a program product is provided. The program product is, for example, a hard disk, a Universal Serial Bus (USB) flash memory drive, or an optical disc. The program product includes program code, and the program code is run to manage a storage medium. The program code in the program product is run, to perform the first aspect and the possible implementations of the first aspect.

BRIEF DESCRIPTION OF DRAWINGS

To describe the technical solutions in the embodiments of the present disclosure more clearly, the following briefly describes the accompanying drawings required for describing the embodiments or other approaches. The accompanying drawings in the following description show merely some embodiments of the present disclosure. Other drawings may be derived from these accompanying drawings.

DESCRIPTION OF EMBODIMENTS

The following clearly describes the technical solutions in the embodiments with reference to the accompanying drawings in the embodiments. The described embodiments are merely some but not all of the embodiments of the present disclosure. All other embodiments obtained based on these embodiments shall fall within the protection scope of the present disclosure. For example, this application is described mainly using an SSD as an example. However, an idea of this application is also applicable to another storage medium based on a flash memory, and is further applicable to another storage medium, for example, a shingled magnetic recording (SMR) medium, that cannot perform overwriting (where overwriting means that newly written data directly overwrites old data in a storage medium). A block in the flash memory medium is equivalent to a zone in the SMR medium, and a page in the flash memory is equivalent to a segment of storage space in the zone. The block and the zone are collectively referred to as a storage unit, and the page and the segment of storage space in the zone are collectively referred to as a read/write unit. For brevity, the following only uses a flash memory as an example for description due to a same principle.

Before garbage collection (GC) is performed on a block, a page in the block may be in one of the following three cases: In a first case, the page stores valid data. The page in this state may be marked by setting a valid label and is referred to as a valid page for short. In a second case, the page stores invalid data. The invalid data is data that is no longer required and is relative to the valid data, or is data "deleted" by a host (where the host includes the SSD and devices, such as a computer, a server, and a storage controller, that communicate with the SSD). The page in this state may be marked by setting a stale label and is referred to as a stale page (or an "invalid page") for short. In a third case, the page stores no data. The page in this state is referred to as a free page for short. The free page may store new data in the future, and the free page is marked by setting a clean label or an empty label. Alternatively, the free page is marked by non-label. When the garbage collection is performed, the valid data needs to be migrated to another block, and for the stale page and the free page, no data migration is required. For a block on which garbage collection has been performed, all pages become free pages. To be more specific, storage space occupied by invalid data can be released through the garbage collection, to be provided for the host to use again.

For ease of description, unless otherwise stated, data stored in each valid page is referred to as a data unit in the embodiments. If a data unit is not deleted in a plurality of times of previous garbage collection (where for the SSD, that a data unit in a page is deleted means that a state of the page storing the data unit is set to stale), it indicates that the data unit is not frequently updated, and there is also a relatively low probability that the data unit is deleted in the future. Further, as a quantity of times of garbage collection performed on a block in which the data unit is located increases, a probability that the data unit is deleted in the future decreases. This case may be vividly understood to mean that the data unit becomes "older". Conversely, a data unit on which garbage collection has not been performed or garbage collection has been performed for a quite small quantity of times has a relatively high probability of being deleted in the future, and it may be considered that the data unit is relatively "new". The "deletion" herein also includes a case of "modification". In the SSD, a method for modifying a data unit includes deleting an original data unit, and writing a new data unit into a new storage location. Therefore, "modification" may be considered as a special case of deletion, and is not individually described.

After the embodiments are applied, most data units can be aggregated to different blocks based on different age ranges. A larger quantity of times of garbage collection performed according to the embodiments indicates a larger aggregation degree. For a block mainly including data units that are relatively old, the data units in the block are relatively stable as a whole, and there is a relatively low probability that a stale page appears in the future. In this case, there is a relatively low probability that garbage collection is performed on the block in which the old data units are centralized (usually, that a quantity of stale blocks is greater than a preset threshold is used as a condition for triggering garbage collection in the SSD). Correspondingly, after old data units are aggregated into some blocks, relatively new data units are aggregated in a remaining block. For a block mainly including new data units, there is a relatively high probability that massive stale pages appear. In this case, there is a relatively high probability that garbage collection is performed on the block.

Based on the solution in the embodiments, the data units are aggregated to different blocks based on the age ranges. There is a relatively low probability that garbage collection is performed on a block in which old data units are located;

therefore, a probability that the block in which the old data units are located is erased in the future is decreased, ensuring a service life of the block in which the old data units are located. However, massive stale pages are usually centralized in a block in which new data units are located; consequently, there is a relatively high probability that garbage collection is performed on the block in which the new data units are located. In addition, data migration does not need to be performed on the stale pages in a garbage collection process. Therefore, a quantity of data units that need to be migrated is not excessively large when garbage collection is performed on the block in which the new data units are located, such that a computing resource and a bandwidth resource of a storage device that are occupied due to migration of massive data units are reduced. Moreover, the stale pages all become free pages after the garbage collection, such that a relatively large quantity of available storage space can be obtained after the garbage collection is performed on the block in which the new data units are located. Furthermore, after the new data units and the old data units are tiered, a quantity of blocks on which garbage collection has been performed in the SSD is decreased in total.

Recognizing an age of a data unit is one of problems to be resolved in the embodiments. To recognize an age of a data unit, a collection parameter is set for a block in the embodiments. The collection parameter may be a numeral or a symbol or a group of numerals or symbols, and the collection parameter includes a first collection parameter. A value of the first collection parameter is updated during garbage collection to approximately reflect an age change of the data unit in the block. If no garbage collection has been performed on data in the block, a value of the first collection parameter of the block is an initial value (where the initial value is, for example, 0). If garbage collection is performed on data in the block, a value of a first collection parameter of a block from which a data unit is emigrated before the garbage collection and a value of a first collection parameter of a block to which a data unit is immigrated before the garbage collection jointly determine a value of the first collection parameter of the block to which a data unit is immigrated after the garbage collection.

For example, a data unit (valid data) in one or more blocks is replicated to one or more other blocks (where for ease of descriptions, a block from which the data unit is replicated is referred to as a source block, and a block to which the data unit is replicated is referred to as a destination block). A value of a first collection parameter of the destination block is updated, and an updated value of the first collection parameter is determined based on an original value of the first collection parameter of the destination block and a value of a first collection parameter of the source block. In an optional manner, the original value of the first collection parameter of the destination block and the value of the first collection parameter of the source block are both positive numbers, and the new value of the first collection parameter of the destination block is determined based on the larger one of the original value of the first collection parameter of the destination block and the value of the first collection parameter of the source block. For example, the new value of the first collection parameter of the destination block is the larger value plus a fixed positive number (for example, 1). Alternatively, in another optional manner, the original value of the first collection parameter of the destination block and the value of the first collection parameter of the source block are both negative numbers, and the new value of the first collection parameter of the destination block is determined based on the smaller one of the original value of the first collection parameter of the destination block and the value of the first collection parameter of the source block plus a fixed negative number. Certainly, there may be another solution. For example, the original value of the first collection parameter of the destination block or the value of the first collection parameter of the source block is multiplied by a constant to obtain a value, and then the obtained value plus or minus a fixed value is used as the new value of the first collection parameter of the destination block. When the initial value is 0 and the fixed positive number is 1, a new value of a first collection parameter of a block may be interpreted as: each piece of valid data stored in the block is corresponding to a quantity of times of migration performed previously because of garbage collection (where an allowed quantity of times of migration of the valid data may be 0), and after the garbage collection, the new value of the first collection parameter is the largest one of these quantities of times.

It should be noted that in the SSD, first collection parameters of a plurality of blocks can statistically reflect ages of data units in the plurality of blocks as a whole. However, few exceptions are allowed in the embodiments. To be more specific, there may be a block whose first collection parameter does not correctly reflect an age of a data unit in the block. This exception may reduce a technical effect of the present disclosure to some extent, but does not prevent achievement of the technical effect of the embodiments of the present disclosure.

Figure 1:
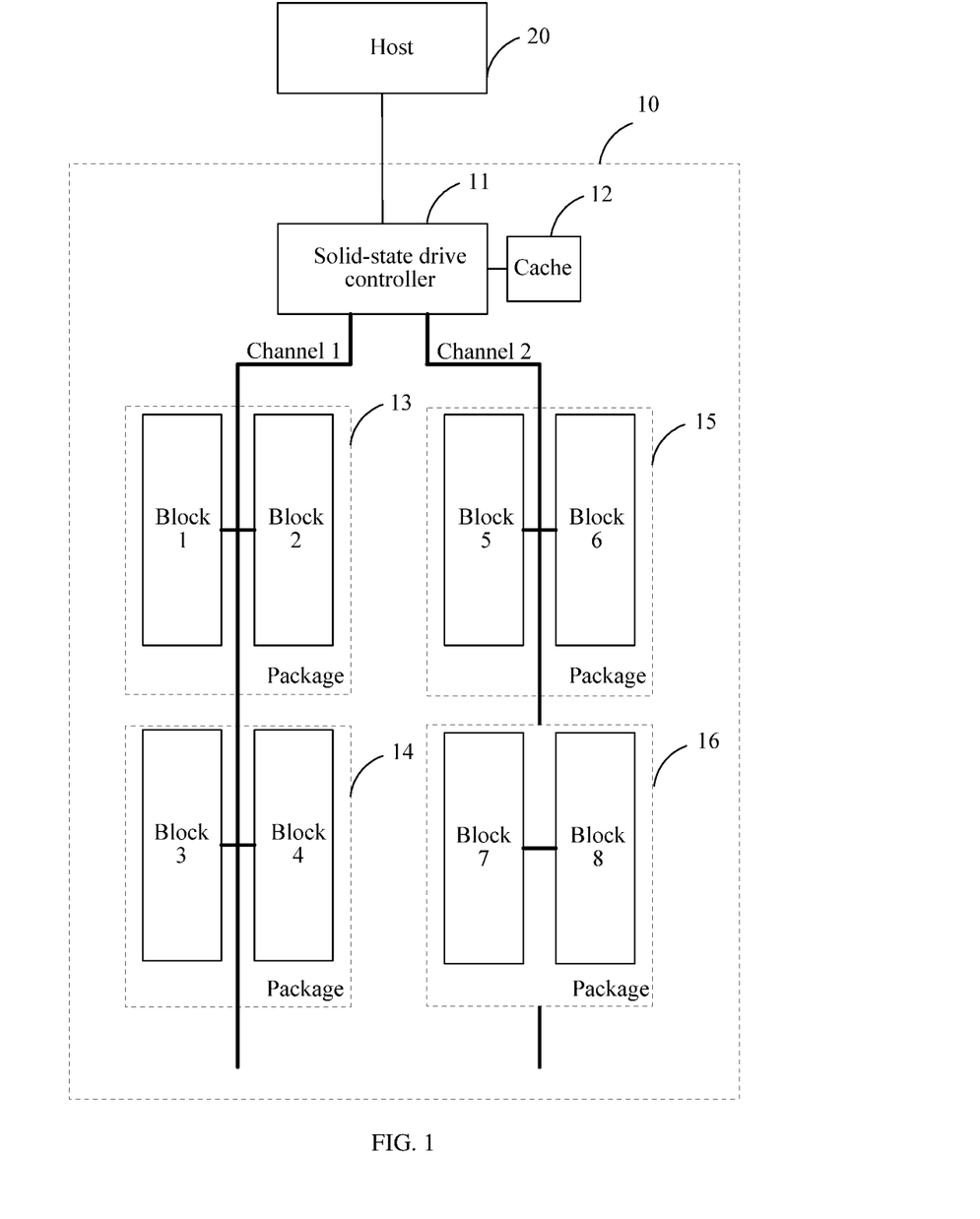
FIG. 1 is a schematic diagram of an embodiment of a solid-state drive.

FIG. 1 is a structural diagram of a solid-state drive 10. The solid-state drive 10 communicates with a host 20. The solid-state drive includes a solid-state drive controller 11, a cache 12 (for example, a random access memory RAM) connected to the solid-state drive controller 11, and a plurality of packages. The solid-state drive controller 11 is connected to the packages using channels, each package has blocks, and the block is a minimum erasure unit. A block 1, a block 2, a block 3, a block 4, a block 5, a block 6, a block 7, and a block 8 provide physical storage space for the solid-state drive 10, each block includes a plurality of pages or a page, and the page is a minimum read/write unit. Certainly, there may be more packages/blocks in the solid-state drive 10 that are not shown in FIG. 1. The solid-state drive controller 11 may include components such as a cache interface, a processor, and a flash memory controller. The cache interface communicates with the cache 12, the processor executes a computer instruction, and the flash memory controller controls the blocks.

Figure 2:
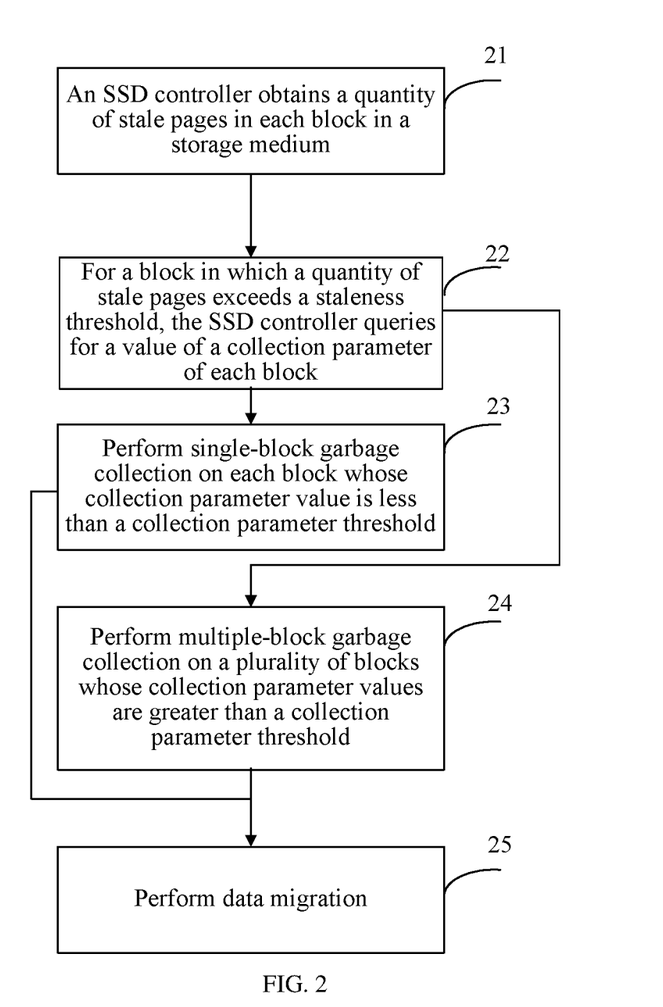
FIG. 2 is a flowchart of an embodiment of garbage collection for a storage medium.

FIG. 2 shows a process of performing data migration between blocks for garbage collection. An entire garbage collection process (including steps shown in FIG. 2) may be performed by the solid-state drive 10 in FIG. 1, e.g., via the solid-state drive controller 11 by running the computer instruction in the cache 12. After the SSD runs, the computer instruction is loaded to the cache 12. Before the SSD runs, the computer instruction may be stored in a nonvolatile storage medium, for example, built into firmware of a network adapter of a host.

Step 21: The SSD controller obtains a quantity of stale pages in each block in a storage medium, where garbage collection needs to be performed on a block in which a quantity of stale pages exceeds a garbage collection threshold.

An SSD includes the controller and the storage medium, where the controller communicates with the storage medium and manages the storage medium. The storage medium is, for example, a flash memory chip.

There are a plurality of manners of obtaining the quantity of stale pages. For example, the quantity of stale pages is prestored in the cache, and is periodically updated. Therefore, the SSD controller may directly obtain the quantity of stale pages from the cache. Alternatively, the SSD controller directly queries for a quantity of pages for which a "stale" label is set in each block, to obtain the quantity of stale pages in each block.

Step 22: For a block in which a quantity of stale pages exceeds a staleness threshold, the SSD controller queries for a value of a first collection parameter of each block. The value of the first collection parameter may be stored in some blocks, or may be stored in the cache of the SSD.

For a block whose first collection parameter value is less than a first collection parameter threshold, single-storage-unit (as described above, the storage unit in this embodiment is a "block" in a flash memory) garbage collection in step 23 is performed. For a block whose first collection parameter value is greater than or equal to the first collection parameter threshold, multiple-storage-unit (the storage unit in this embodiment is a "block") garbage collection in step 24 is performed.

It should be noted that step 22 may be performed before or after step 21. Alternatively, the two steps may be simultaneously performed. To be more specific, the value of the first collection parameter of the block is queried for when the quantity of stale pages is queried for.

Step 23: Perform single-block garbage collection on each block whose first collection parameter value is less than a first collection parameter threshold, and update a value of a first collection parameter of a destination block.

If a source block in the single-block garbage collection is referred to as a first block, and the destination block is referred to as a second block, this step may be described as migrating data in a valid read/write unit in a first storage unit to a second storage unit. The first storage unit includes a stale read/write unit, and the second storage unit has an idle read/write unit.

In the single-block garbage collection, garbage collection is performed on a single block. In other words, in one garbage collection operation, data units in at least two source blocks are not replicated to at least one destination block.

Figure 3:
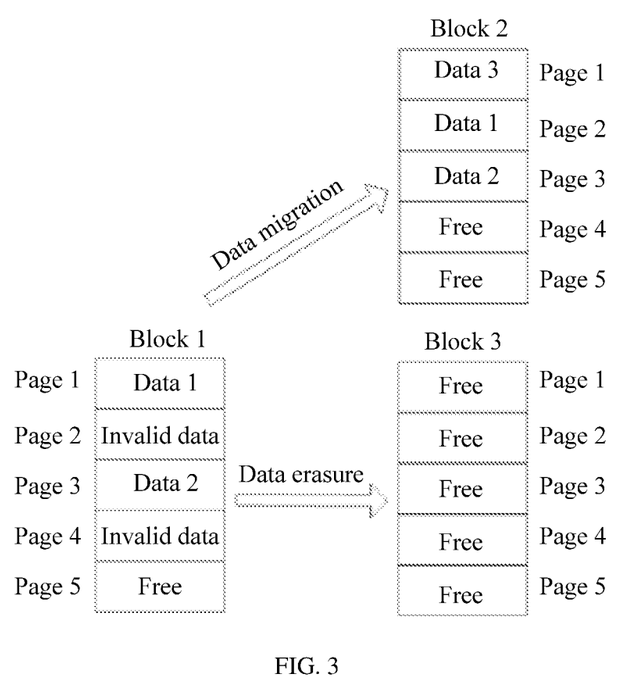
FIG. 3 is a schematic diagram of an embodiment of a single-block garbage collection process.

FIG. 3 is a schematic diagram of a single-block garbage collection process. A block 1 has five pages (This is merely an example, as a block may have more pages. For example, a block has a size of 256 KB, and a page has a size of 4 KB). The block 1 has two data units: data 1 and data 2. The data 1 and the data 2 are stored respectively in a page 1 and a page 3. In addition, a page 2 and a page 4 of the block 1 store invalid data, and a page 5 is a free page. The SSD controller replicates the two data units, that is, the data 1 and the data 2, to a block 2. Pages in which the data 1 and the data 2 are located after being replicated to the block 2 and a page in which original data (data 3) is located in the block 2 are in a neighboring location relationship in the storage medium, and the pages in which the data 1 and the data 2 are located are also adjacent. In addition, a relative location relationship, in the block 1, between the pages in which the data 1 and the data 2 are located is maintained. To be more specific, in the block 1, a number of the page in which the data 1 is located is less than a number of the page in which the data 2 is located. In the block 2, the number of the page in which the data 1 is located is still less than the number of the page in which the data 2 is located. After the replication is completed, the block 1 is erased. All pages in the erased block 1 become free pages, and there is no valid data in the erased block. Therefore, a value of a first collection parameter of the erased block is reset to an initial value (for example, 0). In this embodiment, the block 2 used as a destination block already has the data 3. In another implementation, a free block may be used as a destination block to replicate a data unit. Two pages whose page numbers are consecutive are adjacent. Using FIG. 3 as an example, the page 3 is adjacent to the page 1 and the page 2. Values of page numbers describe a location relationship of pages. For example, before migration, the page number of the page (the page 1) in which the data 1 is located (where the number of the page 1 in the block 1 is 1) is less than the page number of the page (the page 3) in which the data 2 is located (where the number of the page 3 in the block 1 is 3). After the data 1 and the data 2 are migrated to the block 2, a page number of the page (the page 2) in which the data 1 is located (where the number of the page 2 in the block 2 is 2) is also less than a page number of the page (the page 3) in which the data 2 is located (where the number of the page 3 in the block 2 is 3). It may be learned that before and after the migration, the page number of the page in which the data 1 is located is still less than the page number of the page in which the data 2 is located, and the location relationship is maintained.

After the SSD receives data from the host, how to store the data to pages in a block by the SSD complies with a rule. For example, for a same block, data received by the host first is written into a page whose page number is smaller in the block, and data received by the host later is written into a page whose page number is larger. Alternatively, conversely, data received first is written into a page whose page number is larger in the block, and data received later is written into a page whose page number is smaller. The rule is related to a manufacture technique of an SSD vendor. Therefore, SSDs manufactured by a same vendor usually comply with a same rule. In this way, a chronological order in which data units are written into the block can be known based on page numbers. If data received by the host first is written into a page whose page number is smaller, a write time of the data in the page whose page number is smaller is not later than data in a page whose page number is larger. The order described in this embodiment describes only a front-rear location relationship between two pages in the storage medium, and does not indicate whether the two pages are spaced by another page. For ease of understanding, a term "initial write pointer" is used to describe an order of using free pages in a block. When data is written into the block, the data is sequentially written starting from the initial write pointer of the block until all idle read/write units are used. A time point at which data is written into a page close to the initial write pointer is not later than a time point at which data is written into a page away from the initial write pointer.

In the destination block, some or all of data units remain in the chronological order. Therefore, a chronological order in which the data units are written by the host into the SSD can still be approximately determined based on a sorting relationship of pages in which the data units are located. Using FIG. 3 as an example, a time at which the host writes the data 1 into the block 1 is not later than a time at which the host writes the data 2 into the block 1, and therefore the number of the page in which the data 1 is located is less than the number of the page in which the data 2 is located. After the data 1 and the data 2 are replicated to the block 2, the number of the page in which the data 1 is located is less than the number of the page in which the data 2 is located. Briefly, the rule is still complied with in the destination block 2 in FIG. 3. To be more specific, in a same block, there is a correspondence between a page number and a chronological order in which the host writes data into the SSD.

After the replication is completed, all data in the block 1 is erased. After the erasure, page 1 to page 5 are all free pages.

This step further includes updating a value of a first collection parameter. The value of the first collection parameter is related to a quantity of times for which data units in the SSD are replicated because of the garbage collection.

For example, if there is no valid data in the destination block before the garbage collection, a value of a first collection parameter of the destination block may be determined based on a value of a first collection parameter of a source block. Further, the value of the first collection parameter of the destination block may be determined based on the value of the first collection parameter of the source block and a fixed incremental. The fixed incremental is, for example, 1. For example, the value of the first collection parameter is an integer not less than 0. A principle of updating the value of the first collection parameter of the destination block is: "the value of the first collection parameter of the destination block=the value of the first collection parameter of the source value+1". When an initial value of a first collection parameter of a block is, for example, 0 (certainly, the initial value may alternatively be another numeral), it indicates that no garbage collection is performed on valid data in the block. After the garbage collection is performed, 1 is added to the value of the first collection parameter to obtain 0+1=1. If a block serving as a destination block in previous garbage collection is used as a source block to perform single-block garbage collection again, for a destination block in the single-block garbage collection performed again, the value of the first collection parameter is 1+1=2.

In addition, if there is valid data in the destination block before the garbage collection, a value of the first collection parameter of the destination block after the multiple-block garbage collection is determined based on both a value of the first collection parameter of the source block and the value of the first collection parameter of the destination block before the multiple-block garbage collection. This is applicable to both single-block garbage collection and multiple-block garbage collection. For example, in the single-block garbage collection and the multiple-block garbage collection, the value of the first collection parameter of the destination block after the garbage collection=max (the value of the first collection parameter of the source block, the value of the first collection parameter of the destination block before the garbage collection+a fixed value. For example, assuming that before the garbage collection, the value of the first collection parameter of the source block is 5 and the value of the first collection parameter of the destination block is 3, after the garbage collection, the value of the first collection parameter of the destination block is max (5, 3)+1=6. In this case, the value of the first collection parameter of the destination block is updated to 6.

In conclusion, there are two cases of updating a data service life of the destination block in the garbage collection. In a first case, if data units in all valid pages in the destination block are all from the source block after the garbage collection, the value of the first collection parameter of the destination block is the value of the first collection parameter of the source value plus 1 after the garbage collection. In a second case, after the garbage collection, if the destination block includes not only data units that come from the source block, but also another data unit that originally exists in the destination block, a new value of the first collection parameter of the destination block is determined based on the value of the first collection parameter of the source block and an original value of the first collection parameter of the destination block. For example, the larger one of the value of the first collection parameter of the source block and the original value of the first collection parameter of the destination block plus 1 is used as the new value of the first collection parameter of the destination block.

Generally, a longer service life of a block indicates a larger quantity of times of garbage collection previously performed on data in the block and a lower probability that the data is deleted/rewritten in the future.

Using the first case as an example, the value of the first collection parameter may alternatively be updated in another manner. For example, the first collection parameter is a numeral not greater than 0. A principle of updating the value of the first collection parameter is: "the value of the first collection parameter of the destination block=the value of the first collection parameter of the source value −5". In this case, if a current value of the first collection parameter of the source block is −6, the value of the first collection parameter of the destination block is −6−5=−11. In addition, there may be more implementation solutions. For example, all values of first collection parameters are numerals not less than 0, and "the value of the first collection parameter of the destination block=the value of the first collection parameter of the source block×1.01+3".

Step 24: Perform multiple-block garbage collection on a plurality of blocks whose first collection parameter values are greater than a first collection parameter threshold, and update a value of a first collection parameter of a destination block.

In the multiple-block garbage collection, the plurality of blocks whose first collection parameters values are less than the first collection parameter threshold are used as a garbage collection group, and data units in the blocks in the same group are replicated to the destination block. There may be one or more destination blocks corresponding to source blocks in a same group. In other words, valid data in at least two source blocks is all replicated to at least one destination block. When there is more than one garbage collection group, because operation manners for garbage collection groups are the same, unless otherwise stated, the following uses one group as an example for description.

The multiple-block garbage collection is garbage collection with respect to a plurality of source blocks, and therefore may be referred to as cross-block garbage collection.

When a single destination block can sufficiently accommodate all replicated data, the single destination block is used to accommodate the replicated data. When it is difficult for free pages in a single destination block to accommodate all replicated data, at least two destination blocks are used to accommodate the replicated data. Each time after a destination block is filled up, a next destination block is used to continue storing replicated data until all the replicated data is stored to the destination blocks. Then, the data in all the source blocks in the group may be erased.

A difference from the single-block garbage collection described in step 23 is that in this step, there are at least two source blocks in each group. It should be particularly noted that grouping is not a necessary step. A scenario to be described in this step is: One or more same destination blocks are used for the plurality of blocks in a garbage collection process. Compared with the multiple-block garbage collection, the single-block garbage collection means that each garbage collection group has only one source block.

To distinguish from the single-block garbage collection in step 23, unless otherwise stated subsequently, the source block and the destination block in the single-block garbage collection are respectively referred to as a first source block and a first destination block; the source block and the destination block in the multiple-block garbage collection are respectively referred to as a second source block and a second destination block. In the multiple-block garbage collection, there are a plurality of second source blocks.

The multiple-block garbage collection may be understood as: After a garbage collection process, data units replicated from a plurality of second source blocks exist in one or more second destination blocks. In other words, in a garbage collection process, data units of a plurality of second source blocks are replicated to a same second destination block. There may be a plurality of such second destination blocks, for example, all or some second destination blocks in current multiple-block garbage collection. In addition, in the one or more second destination blocks, data units from a same second source block are not totally consecutive. An operation method is, for example, replicating data units in at least two second source blocks to a same second destination block. If the data units in the at least two second source blocks are alternately replicated to the same second destination block one by one, data units from a same second source block are not consecutive.

Figure 4:
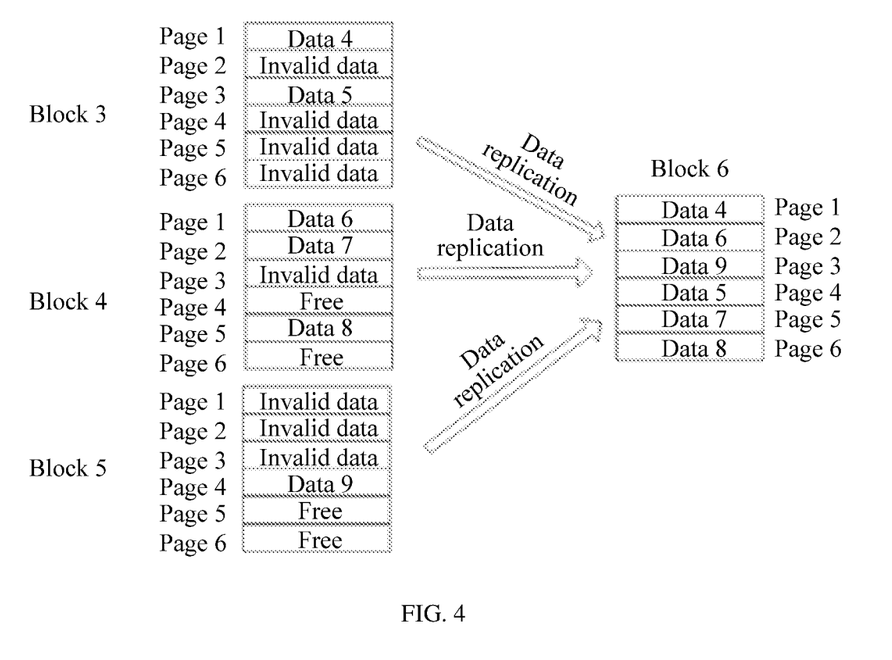
FIG. 4 is a schematic diagram of an embodiment of a multiple-block garbage collection process.

This embodiment further provides a more specific multiple-block garbage collection solution. In a garbage collection process, data units in valid pages in a plurality of second source blocks are alternately replicated to the at least one second destination block. In addition, a plurality of valid pages in a same second source block are replicated in an order stored in the host. Certainly, in another embodiment, the alternate replication manner may not be used. For example, data units in a plurality of valid pages may be concurrently replicated to improve migration efficiency of the data units, provided that a status after the replication is completed conforms to this relationship. For understanding of this implementation more conveniently, refer to FIG. 4. In FIG. 4, a block 3, a block 4, and a block 5 are second source blocks, and a block 6 is a second destination block. Data units that are not replicated in valid pages in the block 3, the block 4, and the block 5 are separately replicated to the block 6. These data units are respectively data 4, data 6, and data 9. Then, date of next valid pages (data 5 and data 7) that are not replicated in the block 3 and the block 4 are alternately replicated to the block 6. Data units in all valid pages in the block 5 have been replicated in the last round, and therefore the block 5 no longer participates in this round of replication. Subsequently, a next data unit (namely, data 8) that is not replicated in the block 4 is replicated to the block 6. All data units in the block 4 and the block 5 have been replicated in the last round, and therefore the block 4 and the block 5 no longer participate in this round of replication. Moreover, it may further be learned from FIG. 4 that in a same block, page numbers gradually increase from top to bottom. The data 4 is above the data 5, the data 6 is above the data 7, and the data 7 is above the data 8. In the block 6, this location relationship is maintained. In this embodiment, the order stored in the host is first storing a page whose page number is smaller and then storing a page whose page number is larger (that is, the order from top to bottom in FIG. 4). Therefore, for the block 3, the data 4 located above is replicated before the data 5 located below. Similarly, for the block 4, a replication order is sequentially the data 6, the data 7, and the data 8.

When there is only one second destination block, a new value of a first collection parameter of the second destination block is configured based on values of first collection parameters of the second source blocks and an original value of the first collection parameter of the second destination block. For example, the largest one of the values of the first collection parameters of the second source blocks and the original value of the first collection parameter of the second destination block plus 1 (as described above, the new value of the first collection parameter of the destination block=max (the values of the first collection parameters of the source blocks, the value of the first collection parameter of the destination block)+a fixed value) is used as the new value of the first collection parameter of the block. The largest value of the first collection parameters plus 1 herein is merely an example, and the value of the first collection parameter may alternatively be updated in another manner. For example, refer to step 23. Certainly, if the second destination block is a free block before current garbage collection, the original value of the first collection parameter may not be considered. When there is more than one second destination block, migrated data units are first filled into one second destination block, and then continue to be filled into remaining second destination blocks. A calculation method for a value of a first collection parameter of the second destination block that is first filled is the same as the foregoing calculation method used when there is only one second destination block. A value of a first collection parameter of each of the remaining second destination blocks may be calculated using a same calculation method for the second destination block that is first filled; or may not be recalculated but keeps the same as the value of the first collection parameter of the second destination block that is first filled. For brevity, an example in which there is only one second destination block is merely used for description in this embodiment.

Using FIG. 4 as an example, an updated value of a first collection parameter of the block 6 is determined based on values of first collection parameters of the block 3, the block 4, and the block 5. If a data unit (not shown in the figure) originally exists in the block 6, the updated value of the first collection parameter of the block 6 is determined based on the values of the first collection parameters of the block 3, the block 4, and the block 5, and an original value of the first collection parameter of the block 6. For example, a fixed incremental is added to the largest one of these values of the first collection parameters. The fixed incremental is, for example, 1.

If a value of a first collection parameter of one second source block is a first parameter value, a value of a first collection parameter of another second source block is a second parameter value. The method further includes updating the value of the first collection parameter of the second destination block to be a third parameter value based on the first parameter value, the second parameter value, and an original value of the first collection parameter of the second destination block.

It should be noted that a source block in the current garbage collection may serve as a destination block in garbage collection (single-block garbage collection or multiple-block garbage collection) that is performed previously. In the garbage collection that is performed previously, a value of a first collection parameter of a destination block in previous garbage collection is configured according to a same rule. Similarly, a source block in the garbage collection that is performed previously may be a destination block in garbage collection (single-block garbage collection or multiple-block garbage collection) that is performed earlier. It may be learned that, this is a process that can be continuously traced backward until there is a block on which no garbage collection is performed. When the current garbage collection is performed, related blocks include a plurality of second source blocks and at least one second destination block. For each of these blocks, a value of a first collection parameter can also be continuously traced backward. Therefore, values of the first collection parameters of the blocks may all be described as being determined based on a plurality of time points at which garbage collection has been performed on the SSD. Based on a similar factor, the value of the first collection parameter of each of these blocks may be described as being determined based on a quantity of times of the garbage collection performed on the SSD previously. The two manners of describing the value of the first collection parameter are also applicable to the single-block garbage collection.

After the multiple-block garbage collection is performed, the data units in the SSD are tiered to some extent: Older data units are relatively centralized in some blocks, and newer data units are relatively centralized in the other blocks. In this way, a plurality of technical effects described above are achieved. For example, garbage collection is performed on a small quantity of blocks to obtain a same volume of available storage space as that obtained by performing garbage collection on a large quantity of blocks in other approaches.

The foregoing first collection parameter is mainly used to approximately reflect an age change of the data unit in the block. The first collection parameter may be understood as: The storage unit stores at least one data unit (valid data). For each data unit, the data unit is replicated previously (where a quantity of times of replication is not 0) because of garbage collection or not replicated (where a quantity of times of replication is 0) because of garbage collection. Among quantities of times corresponding to the data units, the largest quantity of times is used as the first collection parameter of the storage unit. Optionally, the collection parameter may further include a second collection parameter.

A value of the second collection parameter may indicate a time point at which the data unit in the block is migrated for the first time because of multiple-storage-unit garbage collection. Before the multiple-block garbage collection, the second collection parameter may have no value or have an initial value (for example, 0). There are a plurality of reasons for migrating the data unit. For example, migration is performed because of single-block garbage collection, or is performed for a reason other than garbage collection. For these types of migration, the value of the second collection parameter is not recorded. For example, a description manner of the value of the second collection parameter may be 17:40 on Jan. 28, 2018.

If no garbage collection has been performed on the second source blocks and the second destination block before the current multiple-block garbage collection, values of second collection parameters of the second source block and the second destination block are all initial values (for example, the initial values are 0 or null). For example, if a quantity of second source blocks and a quantity of second destination blocks are four in total, values of the second collection parameters of the second source blocks and the second destination block are all null, and a value of a time point of the current multiple-block garbage collection is 17:50 on Jan. 28, 2018, after the current multiple-block garbage collection is performed, the value of the second collection parameter of the second destination block is updated to 17:50 on Jan. 28, 2018.

If a value of the second collection parameter of any of the second source blocks and the second destination block is not an initial value before the current multiple-block garbage collection, an earliest time point is used as the value of the second collection parameter of the second destination block. In a first example, if a quantity of second source blocks and a quantity of second destination blocks are four in total, and values of the second collection parameters of the second source blocks and the second destination block are respectively null, null, null, and 17:40 on Jan. 28, 2018, the value of the second collection parameter of the second destination block is 17:40 on Jan. 28, 2018. In a second example, if a quantity of second source blocks and a quantity of second destination block is four in total, and values of the second collection parameters of the second source blocks and the second destination block are respectively 00:00 on Jan. 1, 2015, null, null, and 17:40 on Jan. 28, 2018, the value of the second collection parameter of the second destination block is 00:00 on Jan. 1, 2015.

It may be learned from the foregoing two examples that in a garbage collection process, a value of a multiple-block garbage collection time point of a destination block is determined based on a value of a multiple-block garbage collection time point of a source block and the value of the multiple-block garbage collection time point of the destination block. A value of a multiple-block garbage collection time point of a destination block in the single-block garbage collection is determined using the same method.

The second collection parameter may reflect an aging degree of the data unit in the block to some extent. The second collection parameter and the first collection parameter are cooperated for use, such that the aging degree of the data unit in the block can be more accurately reflected. After garbage collection is performed on the SSD for a plurality of times, a service life rule of the data unit in the block in the SSD is: an age of a data unit in a block in which "a value of a first collection parameter exceeds the first collection parameter threshold and a value of a second collection parameter is earlier">an age of a data unit in a block in which "a value of a first collection parameter exceeds the first collection parameter threshold and a value of a second collection parameter is later">an age of a data unit in a block in which "a value of a first collection parameter does not exceed the first collection parameter threshold". Certainly, as described above, this is a statistical result, and at least a specific quantity of blocks comply with the rule. However, in this embodiment, some blocks are allowed not to comply with the rule. For example, data in the SSD has been more properly distributed to some extent provided that some blocks comply with the rule, and an expected technical effect can be achieved in this embodiment of the present disclosure.

It should be noted that the second collection parameter is optional. Even though there is no second collection parameter, the first collection parameter is compared with the first collection parameter threshold, to implement block classification. Statistically, an age of a data unit in a block in which "the first collection parameter exceeds the first collection parameter threshold">an age of a data unit in a block in which "the first collection parameter does not exceed the first collection parameter threshold".

It should be particularly noted that step 23 is an optional step. Although step 23 is not performed and only step 24 is performed, a beneficial technical effect can also be achieved.

If step 23 is not performed, the value of the first collection parameter does not need to be determined in step 24, and the multiple-block garbage collection is directly performed on a block whose quantity of stale pages (the source blocks in step 23 and step 24 are all blocks whose quantity of stale pages is greater than the staleness threshold) exceeds the staleness threshold.

Step 25: Perform data migration. A data unit in a block whose data unit is older is migrated to a block that is severely worn; and/or a data unit in a block whose data unit is newer is migrated to a block that is slightly worn. A determining basis of a wear degree may be set by a system. For example, the wear degree may be determined based on one or more related parameters. When the wear degree (or the related parameter) exceeds a threshold (or reaches a range), it may be determined that the wear degree is severe. Otherwise, it is determined that the wear degree is not severe (or slight). To be more specific, a storage unit is selected based on the first collection parameter, and a data unit in the selected storage unit is migrated to a storage unit selected based on the wear degree.

The following uses an example in which a data unit in a block that is relatively old is migrated to a block that is severely worn. If the threshold is 100 times, a block whose quantity of times of erasure exceeds 100 times is a block that is severely worn, and a block whose quantity of times of erasure is less than 100 times is a data block that is slightly worn. If the first collection parameter threshold is, for example, 20, according to step 25, a data unit in the block that is severely worn (where the quantity of times of erasure is greater than 100) may be migrated to a block whose first collection parameter value is greater than 20. In this implementation, the age of data unit in the block is determined based on the value of the first collection parameter. Optionally, in another manner, the age of the block is determined based on both the first collection parameter and the second collection parameter. For example, the first collection parameter threshold is 20, and a second collection parameter threshold is Jan. 13, 2018. According to step 25, a data unit in the block that is severely worn (where the first collection parameter is greater than 20 and the quantity of times of erasure is greater than 100) may be migrated to a block whose second collection parameter is earlier than Jan. 13, 2018.

As described in step 24, there are at least two manners of determining the age of the data unit in the block. In a first manner, the value of the first collection parameter is used for determining. In another manner, the values of the two parameters, that is, the first collection parameter and the second collection parameter, are used for determining. For example, one of the following rules holds true: (1) A data unit whose first collection parameter value is larger is older than a data unit whose first collection parameter value is smaller. (2) For two data units whose first collection parameters are both greater than the first collection parameter threshold, a data unit whose second collection parameter is earlier is older than a data unit whose second collection parameter value is later.

In some cases, there is also a rule (3). A data unit whose second collection parameter is earlier is older than a data unit whose second collection parameter value is later.

Therefore, in a feasible implementation, (1) The SSD controller selects, based on the wear degree, M blocks that are severely worn, replicates data units in the M blocks to other blocks having free pages, and erases content in the M blocks; (2) calculates a total quantity P of idle pages in the M blocks; (3) selects N blocks based on storage space that can be provided by the M blocks, where data units included in the N blocks are data units that are relatively old in the SSD, for example, the N blocks whose second collection parameter values are relatively early are selected from blocks whose first collection parameters exceed the first collection parameter threshold, and the N blocks have Q valid pages, where Q≤P; and (4) migrates the Q valid pages to the M blocks.

It should be particularly noted that using the rule (1) as a basis of selecting a source data unit for the garbage collection is described in the foregoing garbage collection solution. For example, the rule (2) may alternatively be used as a determining basis of selecting a source data unit for the garbage collection. For example, a step of selecting a group of storage units from the plurality of storage units based on the first collection parameters is updated to selecting a group of storage units from the plurality of storage units based on the first collection parameters and the second collection parameter (for example, data units whose second collection parameters all belong to a same time period are selected from a plurality of data units whose first collection parameters are greater than the first collection parameter threshold, and the selected data units are used as a group of source storage units for the garbage collection). In consideration of a length of this specification, details are not described herein.

The present disclosure further provides an embodiment of a program product. The program product includes program code, and the program code is run to manage a storage medium (including storage units). The storage medium includes a plurality of storage units, each storage unit has a first collection parameter, the first collection parameter is related to data in the storage unit, and each storage unit includes a plurality of read/write units. The program product includes at least one component operable to perform each step in the foregoing method. A program in the storage medium may be executed by the storage medium (for example, the medium controller), or is executed by a computer device communicating with the storage medium, to manage the storage unit.

What is claimed is:

1. A garbage collection method for a storage medium comprising a plurality of storage units, wherein each of the plurality of storage units comprises a first collection parameter and a second collection parameter, wherein each of the plurality of storage units comprises a plurality of read/write units, and wherein the garbage collection method comprises:

selecting a group of storage units from the plurality of storage units, wherein a first value of the first collection parameter of each of the group of storage units is greater than or equal to a first collection parameter threshold and is based on an age of each of the group of storage units, wherein a second value of the second collection parameter of each of the group of storage units satisfies a value range and indicates a time point at which a data unit in a block is migrated for a first time because of multiple-storage-unit garbage collection operations, wherein each of the group of storage units comprises a stale read/write unit, and wherein the stale read/write unit is a read/write unit storing invalid data; and replicating data in a first valid read/write unit in the group of storage units and data in a second valid read/write unit in the group of storage units to a same destination storage unit, wherein the first valid read/write unit and the second valid read/write unit belong to different storage units in the group of storage units, and wherein the same destination storage unit is selected from the plurality of storage units.

2. The garbage collection method for the storage medium according to claim 1, wherein the group of storage units comprises a first storage unit, and wherein the first collection parameter of the first storage unit is related to a quantity of migrations triggered by garbage collection of the data in the first storage unit.

3. The garbage collection method for the storage medium according to claim 1, wherein a difference between values of the first collection parameters of any two storage units in the group of storage units is not greater than a preset value.

4. The garbage collection method for the storage medium according to claim 1, wherein the first valid read/write unit belongs to a first storage unit in the group of storage units and the first value of the first collection parameter of the first storage unit is a first parameter value, wherein the second valid read/write unit belongs to a second storage unit in the group of storage units and the first value of the first collection parameter of the second storage unit is a second parameter value, and wherein the method further comprises configuring a value of a first collection parameter of the same destination storage unit to be a third parameter value based on the first parameter value, the second parameter value, and an original value of the first collection parameter of the same destination storage unit.

5. The garbage collection method for the storage medium according to claim 4, further comprising performing garbage collection on the storage medium for a plurality of times at a plurality of previous time points, and wherein the first parameter value, the second parameter value, and the original value are determined based on the plurality of previous time points at which the garbage collection has been performed.

6. The garbage collection method for the storage medium according to claim 5, wherein the first parameter value, the second parameter value, and the original value represent three same or different time points in the plurality of time points, and wherein the third parameter value is determined by comparing the three same or different time points.

7. The garbage collection method for the storage medium according to claim 5, wherein data is sequentially written based on a write time into a data storage location in the same destination storage unit starting from an initial write pointer of the same destination storage unit, wherein data replicated from the first valid read/write unit is stored in a first location, wherein data replicated from the second valid read/write unit is stored in a second location, and wherein the first location is closer to the initial write pointer of the same destination storage unit than the second location.

8. The garbage collection method for the storage medium according to claim 4, further comprising performing garbage collection for a plurality of times at a plurality of previous time points, wherein the first parameter value, the second parameter value, and the original value are determined based on a quantity of times of previously performing the garbage collection.

9. The garbage collection method for the storage medium according to claim 6, wherein the third parameter value is determined based on the first parameter value, the second parameter value, the original value, and a fixed incremental.

10. The garbage collection method for the storage medium according to claim 1, wherein the same destination storage unit is an idle storage unit.

11. The garbage collection method for the storage medium according to claim 10, wherein the first valid read/write unit belongs to a first storage unit in the group of storage unit, wherein the first value of the first collection parameter of the first storage unit is a fourth parameter value, wherein the second valid read/write unit belongs to a second storage unit in the group of storage units, wherein the second value of a first collection parameter of the second storage unit is a fifth parameter value, and wherein the method further comprises configuring a value of a first collection parameter of the same destination storage unit based on the fourth parameter value and the fifth parameter value.

12. The garbage collection method for the storage medium according to claim 1, wherein the group of storage units comprise a particular storage unit, and wherein the method further comprises migrating a data unit in the particular storage unit to another storage unit selected based on a wear degree.

13. The garbage collection method for the storage medium according to claim 1, wherein the second value of the second collection parameter of a first storage unit in which the first valid read/write unit is located is a seventh parameter value, wherein the second value of a second collection parameter of a second storage unit in which the second valid read/write unit is located is an eighth parameter value, wherein the method further comprises configuring a value of a the second collection parameter of the same destination storage unit based on the seventh parameter value, the eighth parameter value, and an original value of the second collection parameter of the same destination storage unit, and wherein the second value of the second collection parameter of the same destination storage unit is related to a time point at which garbage collection is performed on the same destination storage unit.

14. The garbage collection method for the storage medium according to claim 12, wherein the group of storage units comprise a particular storage unit, and wherein the method further comprises migrating a data unit in the particular storage unit to another storage unit selected based on a wear degree.

15. The garbage collection method for the storage medium according to claim 1, further comprising:

replicating data in all valid read/write units in the group of storage units, except the first valid read/write unit and the second valid read/write unit, to a storage unit outside the group of storage units; and erasing all data in the group of storage units.

16. A storage system comprising:

a plurality of storage units, wherein each of the plurality of storage units comprises a first collection parameter and a second collection parameter, wherein each of the plurality of storage units comprises a plurality of read/write units; and a medium controller coupled to the plurality of storage units and configured to:

select a group of storage units from the plurality of storage units, wherein a first value of the first collection parameter of each of the group of storage units is greater than or equal to a first collection parameter threshold and is based on an age of each of the group of storage units, wherein a second value of the second collection parameter of each of the group of storage units satisfies a value range and indicates a time point at which a data unit in a block is migrated for a first time because of multiple-storage-unit garbage collection operations, wherein each of the group of storage units comprises a stale read/write unit, and wherein the stale read/write unit is a read/write unit storing invalid data; and replicate data in a first valid read/write unit and a second valid read/write unit in the group of storage units to a same destination storage unit, wherein the first valid read/write unit and the second valid read/write unit belong to different storage units in the group of storage units, and wherein the same destination storage unit is selected from the plurality of storage units.

17. The storage system according to claim 16, wherein the group of storage units comprises a first storage unit, and wherein the first collection parameter of the first storage unit is related to a quantity of migrations triggered by garbage collection of data in the storage unit.

18. The storage system according to claim 16, wherein a difference between values of the first collection parameters of any two storage units in the group of storage units is not greater than a preset value.

19. The storage system according to claim 16, wherein the first valid read/write unit belongs to a first storage unit in the group of storage units and the first value of the first collection parameter of the first storage unit is a first parameter value, wherein the second valid read/write unit belongs to a second storage unit in the group of storage units and the first value of the first collection parameter of the second storage unit is a second parameter value, and wherein the medium controller is further configured to configure a value of a first collection parameter of the same destination storage unit to be a third parameter value based on the first parameter value, the second parameter value, and an original value of the first collection parameter of the same destination storage unit.

20. The storage system according to claim 19, wherein the storage system performs garbage collection for a plurality of times at a plurality of previous time points, and wherein the first parameter value, the second parameter value, and the original value are determined based on the plurality of previous time points at which the garbage collection has been performed.

21. The storage system according to claim 20, wherein the first parameter value, the second parameter value, and the original value represent three same or different time points in the plurality of time points, and wherein the third parameter value is determined by comparing the three same or different time points.

22. The storage system according to claim 20, wherein the medium controller is further configured to indicate that data is sequentially written based on a write time into a data storage location in the same destination storage unit starting from an initial write pointer of the destination storage unit, wherein data replicated from the first valid read/write unit is stored in a first location, wherein data replicated from the second valid read/write unit is stored in a second location, and wherein the first location is closer to the initial write pointer of the same destination storage unit than the second location.

23. The storage system according to claim 19, wherein the medium controller is further configured to respectively perform garbage collection for a plurality of times at a plurality of previous time points, wherein the first parameter value, the second parameter value, and the original value are determined based on a quantity of times of previously performing the garbage collection.

24. The storage system according to claim 21, wherein the third parameter value is determined based on the first parameter value, the second parameter value, the original value, and a fixed incremental.

25. The storage system according to claim 16, wherein the same destination storage unit is an idle storage unit.

26. The storage system according to claim 25, wherein the first valid read/write unit belongs to a first storage unit in the group of storage units, wherein the first value of the first collection parameter of the first storage unit is a fourth parameter value, wherein the second valid read/write unit belongs to a second storage unit in the group of storage units, wherein the second value of a first collection parameter of the second storage unit is a fifth parameter value, and wherein the medium controller is further configured to configure a value of a first collection parameter of the same destination storage unit based on the fourth parameter value and the fifth parameter value.

27. The storage system according to claim 16, wherein the group of storage units comprises a particular storage unit, and wherein the medium controller is further configured to migrate a data unit in the particular storage unit to another storage unit selected based on a wear degree.

28. The storage system according to claim 16, wherein each of the plurality of storage units comprises a second collection parameter, wherein the second value of the second collection parameter of a first storage unit in which the first valid read/write unit is located is a seventh parameter value, wherein the second value of a second collection parameter of a second storage unit in which the second valid read/write unit is located is an eighth parameter value, wherein the medium controller is further configured to configure a value of the second collection parameter of the same destination storage unit based on the seventh parameter value, the eighth parameter value, and an original value of the second collection parameter of the same destination storage unit, and wherein the second value of the second collection parameter of the same destination storage unit is related to a time point at which garbage collection is performed on the same destination storage unit.

29. The storage system according to claim 28, wherein the group of storage units selected comprise a particular storage unit, and wherein the medium controller is further configured to migrate a data unit in the particular storage unit to another storage unit selected based on a wear degree.

30. The storage system according to claim 16, wherein the medium controller is further configured to:

replicate data in all valid read/write units in the group of storage units, except the first valid read/write unit and the second valid read/write unit, to a storage unit outside the group of storage units; and erase all data in the group of storage units.

31. A computer program product comprising instructions that are stored on a computer-readable medium and that, when executed by a processor, cause a storage system to:

select a group of storage units from a plurality of storage units in a storage medium, wherein each of the plurality of storage units comprises a first collection parameter and a second collection parameter, wherein a first value of the first collection parameter of each of the group of storage units is greater than or equal to a first collection parameter threshold and is based on an age of each of the group of storage units, wherein a second value of the second collection parameter of each of the group of storage units satisfies a value range and indicates a time point at which a data unit in a block is migrated for a first time because of multiple-storage-unit garbage collection operations, wherein each of the group of storage units comprises a stale read/write unit, and wherein the stale read/write unit is a read/write unit storing invalid data; and replicate data in a first valid read/write unit and a second valid read/write unit in the group of storage units to a same destination storage unit,
wherein the first valid read/write unit and the second valid read/write unit belong to different storage units in the group of storage units, and
wherein the same destination storage unit is comprised in the plurality of storage units.

32. The computer program product according to claim 31, wherein the group of storage units comprises a first storage unit, and wherein a first collection parameter of the first storage unit is related to a quantity of migrations triggered by garbage collection of the data in the storage unit, and wherein the first collection parameter is selected from the collection parameters.

33. The computer program product of claim 31, wherein a difference between values of the first collection parameters of any two storage units in the group of storage units is not greater than a preset value.

34. The computer program product of claim 31, wherein the same destination storage unit is an idle storage unit.

* * * * *